(12) United States Patent
Stekelenburg et al.

(10) Patent No.: US 11,346,693 B2
(45) Date of Patent: May 31, 2022

(54) MILK METER

(71) Applicant: Nedap N.V., Groenlo (NL)

(72) Inventors: Jan Cornelis Stekelenburg, Varsseveld (NL); Jeroen Martin van Dijk, Enschede (NL); Edwin Schäperclaus, Neede (NL)

(73) Assignee: NEDAP N.V., Groenlo (NL)

( * ) Notice: Subject to any disclaimer, the term of this patent is extended or adjusted under 35 U.S.C. 154(b) by 327 days.

(21) Appl. No.: 16/583,333

(22) Filed: Sep. 26, 2019

(65) Prior Publication Data

US 2020/0109973 A1    Apr. 9, 2020

(30) Foreign Application Priority Data

Sep. 28, 2018 (NL) ..................................... 2021725

(51) Int. Cl.
| | | |
|---|---|---|
| G01F 1/52 | (2006.01) | |
| G01F 15/06 | (2022.01) | |
| G01F 15/063 | (2022.01) | |
| A01J 5/01 | (2006.01) | |

(52) U.S. Cl.
CPC .................................. G01F 1/52 (2013.01); A01J 5/01 (2013.01); G01F 15/063 (2013.01); G01F 15/065 (2013.01)

(58) Field of Classification Search
CPC ........ G01F 1/52; G01F 15/063; G01F 15/065; G01F 15/068; G01F 23/26; G01F 23/68; A01J 5/01
See application file for complete search history.

(56) References Cited

U.S. PATENT DOCUMENTS

| | | | |
|---|---|---|---|
| 1,671,106 A | | 4/1923 | Fisher |
| 4,433,577 A | * | 2/1984 | Khurgin ................... A01J 5/01 119/14.17 |
| 6,474,158 B2 | * | 11/2002 | Czarnek .............. G01D 5/2046 73/305 |
| 9,086,314 B2 | * | 7/2015 | Czarnek ................. G01F 23/68 |

(Continued)

FOREIGN PATENT DOCUMENTS

| | | |
|---|---|---|
| EP | 3 155 897 A1 | 4/2017 |
| EP | 3 329 767 A1 | 6/2018 |

(Continued)

OTHER PUBLICATIONS

Dutch Search Report, dated Jun. 14, 2019 (11 pages).

*Primary Examiner* — Justin N Olamit
(74) *Attorney, Agent, or Firm* — Jacobson Holman PLLC

(57) ABSTRACT

Milk meter for measuring a milk flow provided with an inlet the milk flow is supplied to an outlet, a liquid flow path extending from the inlet to the outlet, a stabilization chamber in the liquid flow path and a float therein configured to float on milk. The level of milk in the stabilization chamber depends on the flow rate of the milk flow. At least one sensor device for determining the position of the float in the stabilization chamber for determining the flow rate of the milk flow. The milk meter has an outflow channel and an outflow opening in fluid communication with the outlet via the outflow channel. The sensor device has a first and a second coil which have a fixed distance to each other, and a third coil. The first and second coil and the third coil are displaceable relative to each other.

18 Claims, 14 Drawing Sheets

(56) References Cited

U.S. PATENT DOCUMENTS

| | | | |
|---|---|---|---|
| 9,470,571 B2* | 10/2016 | Huang | G01F 23/26 |
| 10,480,975 B2* | 11/2019 | Daly | A01J 5/01 |
| 2017/0115145 A1* | 4/2017 | van Dijk | A01J 5/01 |

FOREIGN PATENT DOCUMENTS

| WO | 97/13122 A2 | 4/1997 |
|---|---|---|
| WO | 2006/135301 A1 | 12/2006 |

* cited by examiner

MILK METER

BACKGROUND OF THE INVENTION

The invention relates to a milk meter for measuring a flow rate of a milk flow, provided with an inlet to which, in use, the milk flow is supplied, an outlet where the milk flow leaves the milk meter, in use, and a liquid flow path extending from the inlet to the outlet, wherein the milk meter is furthermore provided with a stabilization chamber which is included in the liquid flow path and a float which is in the stabilization chamber and is configured to float on milk of the milk flow that is in the stabilization chamber, wherein the milk meter is configured such that a level of milk in the stabilization chamber depends on the flow rate of the milk flow, wherein the milk meter is furthermore provided with at least one sensor device for determining the position of the float in the stabilization chamber in the direction in which the level of the milk can rise and fall in the stabilization chamber for therewith determining the flow rate of the milk flow through the milk meter, wherein the milk meter is further provided with an outflow channel, wherein the outflow opening is in fluid communication with the outlet via the outflow channel. Such a milk meter is known from Dutch patent application 2017924. The known milk meter is further provided with a magnetization unit which is part of the sensor device, for generating a magnetic field in the stabilization chamber. The magnetic field that is generated is such that the magnetic field strength varies in a height direction h of the stabilization chamber. In the float, an electronic measuring unit is arranged which is also part of the sensor device for measuring the strength of the magnetic field. The strength of the magnetic field is also referred to as a magnetic flux. The measured strength of the magnetic field is a measure of the height at which the float is floating on the milk in the stabilization chamber. Because the height at which the float is floating within the stabilization chamber, in turn, is determined by the flow rate of the milk flow, in this way information about the flow rate is obtained. To put it differently, the flow rate is measured in this manner.

SUMMARY OF THE INVENTION

An object of the invention is to improve the known milk meter. To this end, according to the invention, the sensor device is provided with at least a first and a second coil which have a fixed distance to each other and at least a third coil, wherein the first and the second coil on the one hand and the third coil on the other hand are displaceable relative to each other, wherein the first, second and third coil are mounted such that the position of the third coil on the one hand and the positions of first and second coil on the other hand change with respect to each other when the float moves up or down in the stabilization chamber, and wherein the milk meter is further provided with transmitter means for supplying a transmitting signal to the third coil so that the first and second coil each generate a receiving signal upon receiving the transmitting signal, wherein the milk meter is furthermore provided with signal processing means for, on the basis of the receiving signals of the first and second coil, determining the position of the float with respect to the stabilization chamber and thereby the magnitude of the flow rate. An advantage is that the position of the float and hence the flow rate can be measured very accurately. According to a preferred embodiment, it holds that the signal processing means, in use, determine the ratio between a first receiving signal of the first coil and a second receiving signal of the second coil for determining the position mentioned. Through determination of the ratio, influences from outside, such as temperature fluctuations, are at least substantially eliminated. Preferably, it holds that the signal processing means, in use, determine the logarithm of the ratio for determining the position mentioned. This has as an advantage that as long as the third coil is between the first and second coil, the logarithm of the measured value has a substantially linear relation with the position of the float. If the third coil is not between the first and second coil, however, the position of the float can still be determined. The relation then is not linear anymore, but by calibration the measurement is still suitable for determining the position of the float. In particular, it holds that the axial axes of the coils are each at least substantially directed in the direction in which the float can move up and down in the stabilization chamber. In this way, the sensor unit is sensitive for measuring position changes of the float. Preferably, it holds here that the axial axes of the coils at least substantially coincide. This provides a further optimization of the sensitivity mentioned.

DESCRIPTION OF THE DRAWINGS

The invention will be further elucidated on the basis of the drawing, in which.

DETAILED DESCRIPTION OF THE INVENTION

Figure 2A:
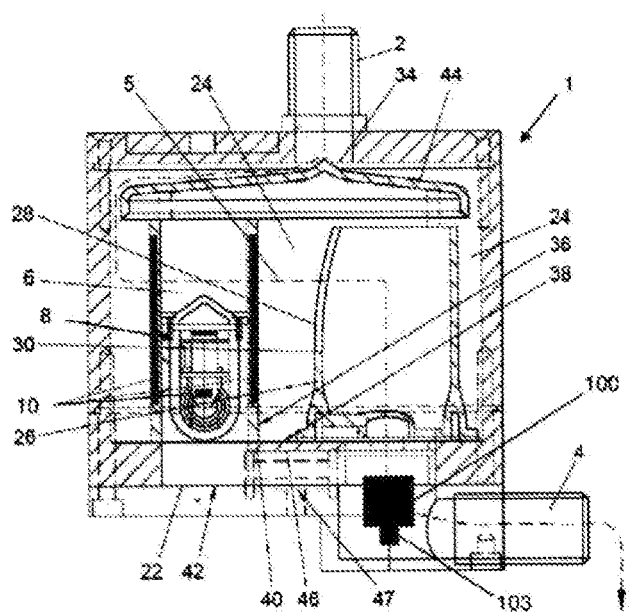
FIG. 2A shows a cross section of the milk meter along the line A-A in FIG. 1B.

In FIG. 2A, with reference numeral 1, a possible embodiment of a milk meter according to the invention is indicated. The milk meter is provided with an inlet 2 into which is supplied, in use, the milk flow whose flow rate is to be measured. Further, the milk meter is provided with an outlet 4 where the milk flow whose flow rate has been measured, in use, leaves the milk meter again. Between the inlet and the outlet extends a liquid flow path 5 which is schematically indicated in the drawing with a broken line. Obviously, the broken line concerns just one possible pathway along which the milk flow can proceed; which is why the representation is schematic.

The milk meter is provided with a stabilization chamber 6 which is also included in the liquid flow path 5. The milk meter is furthermore provided with a float 8 which is in the stabilization chamber and which is configured to float on the milk of the milk flow that, in use, is in the stabilization chamber. The milk meter is configured such that a level of the milk in the stabilization chamber (the height of the liquid surface of the milk in the stabilization chamber) depends on the flow rate of the milk flow. In this example, it holds that the height of the level of the milk in the stabilization chamber increases when the flow rate increases.

The milk meter is further provided with a sensor device 10 for determining the position of the float in the stabilization chamber. The sensor device 10 is provided with at least a first and a second coil which have a fixed distance to each other and at least a third coil, wherein the first and the second coil on the one hand and the third coil on the other hand are displaceable relative to each other, wherein the first, second and third coil are mounted such that the position of the third coil on the one hand and the positions of first and second coil on the other hand change with respect to each other when the float moves up or down in the stabilization chamber, and wherein the milk meter is further provided with transmitter means for supplying a transmitting signal to the third coil so that the first and second coil each generate a receiving signal upon receiving the transmitting signal which has been emitted with the aid of the third coil, wherein the milk meter is furthermore provided with signal processing means for, on the basis of the receiving signals of the first and second coil, determining the position of the float with respect to the stabilization chamber and thereby the magnitude of the flow rate. All this will be further explained on the basis of FIG. 6 et seq. Because the height at which the float is floating within the stabilization chamber, in turn, is determined by the flow rate of the milk flow, in this way information about the flow rate is obtained. To put it differently, the flow rate is measured in this manner.

The milk meter in this example is further provided with a buffer reservoir 24 which is included upstream of the stabilization chamber in the liquid flow path 5. Provided in a sidewall 26 of the buffer reservoir is an outflow opening which extends from a lowest point 30 of the outflow opening upwardly in the direction h and which is in fluid communication with the outlet 4. In this example, it holds that the outflow opening 28 is in fluid communication with the outlet 4 via an outflow channel 32. A top of the buffer reservoir is provided with an inlet opening 34 which is in fluid communication with the inlet 2. The buffer reservoir 24 and the stabilization chamber 6 are connected with each other via a fluid connection 36. The construction is such that the buffer reservoir 24, the fluid connection 36 and the stabilization chamber 6, in use, function as communicating vessels so that, in use, a level of the milk in the stabilization chamber (measured in the direction h) is equal to a level of the milk in the buffer reservoir (likewise measured in the direction h).

In this example, it holds that a bottom 38 of the buffer reservoir, and a bottom 40 of the fluid connection 36 are at a greater height than a bottom 42 of the stabilization chamber. The buffer reservoir and the stabilization chamber can be directly or indirectly open to an environment formed in a milking system for milking animals in which the milk meter is included, for instance via small apertures at a top of the buffer reservoir and the stabilization chamber (not shown). This environment of the system typically has a somewhat reduced pressure P2 (also referred to as vacuum pressure) relative to the air pressure (also referred to as atmospheric pressure P1). This has as a consequence that the buffer reservoir, the stabilization chamber and the fluid connection function as communicating vessels, the vessels being formed by the buffer reservoir and the stabilization chamber. Clearly, in a different application, the buffer reservoir and the stabilization chamber may also be in open communication with an environment outside the milking system and hence with the space in a barn. Also, the buffer reservoir and the stabilization chamber may be in open communication with a space within the milk meter in which the buffer reservoir and the stabilization chamber are included.

Figure 2B:
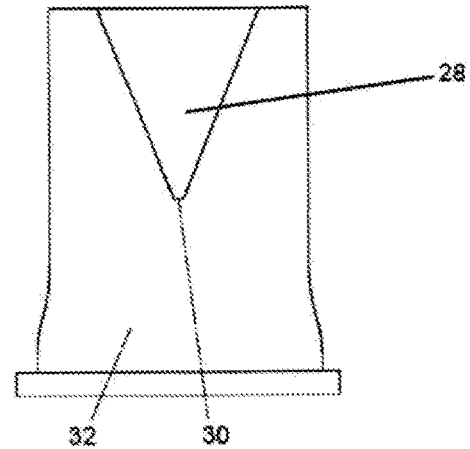
FIG. 2B shows a view of an outflow channel of FIG. 1A.

As can be seen in FIG. 2B, it holds that the outflow opening 28 of the buffer reservoir has a width b which increases in upward direction (in the direction h). The lowest point 30 of the outflow opening is below a half height of the stabilization chamber. This is merely an example. This point may, if desired, be higher or lower and the point 30 may even be on the bottom 38 of the buffer reservoir.

Figure 1A:
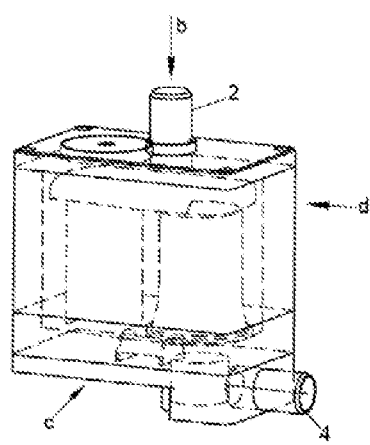
FIG. 1A shows in transparent view a possible embodiment of the milk meter according to the invention.
Figure 1B:
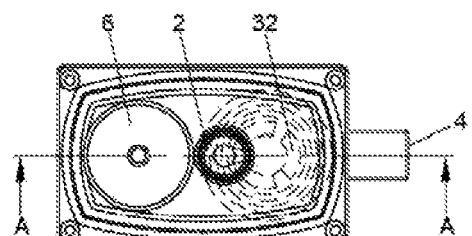
FIG. 1B shows a transparent view of the milk meter according to FIG. 1A in the direction of the arrow b in FIG. 1A according to the invention.
Figure 1C:
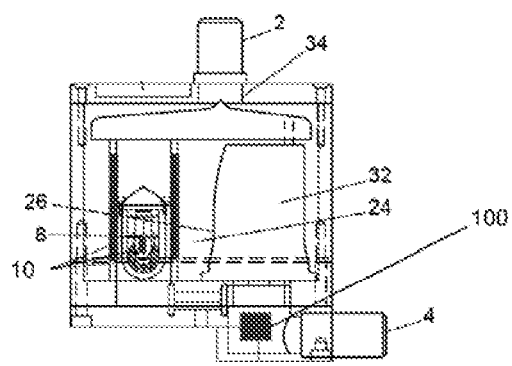
FIG. 1C shows a transparent view of the milk meter according to FIG. 1A in the direction of the arrow c in FIG. 1A according to the invention.
Figure 1D:
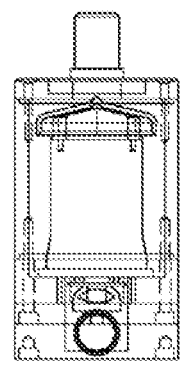
FIG. 1D shows a transparent view of the milk meter according to FIG. 1A in the direction of the arrow d in FIG. 1A according to the invention.

As can be seen in FIGS. 1A and 1B, it holds that the stabilization chamber 6 in this example is of substantially cylinder-shaped design, with the buffer reservoir extending around the stabilization chamber. More particularly, it holds that the buffer reservoir also extends around the outflow channel 32 and that the stabilization chamber 6 is next to the outflow channel 32. The outflow channel in this example is likewise of substantially cylinder-shaped design. However, this is not requisite.

The milk meter is furthermore provided with a milk flow spread plate 44 which is arranged in the liquid flow path 5 between the inlet and the buffer reservoir and is positioned such that the milk flow is distributed by the plate. The milk meter is furthermore provided with a valve 100 which is included in the liquid flow path 5 between the outflow channel 32 and the outlet 4. The valve 100 may also be omitted and be replaced with a tube which provides a fluid connection between the outflow channel 32 and the outlet 4. In the further description of the operation of the milk meter 1 following below it is assumed that this valve 100 is open. After this further description, the particular function and properties of the valve 100 will be discussed. The operation of the milk meter is as follows. When a liquid flow is supplied to the inlet 2, it will first come into contact with the spread plate 44. The milk then flows over the edges of the spread plate into the buffer reservoir 24. This buffer reservoir 24 will start to fill. The stabilization chamber is likewise filled with the milk via the fluid connection 36. The arrangement is such that the level of the milk in the buffer reservoir and in the stabilization chamber is the same. When the level of the milk in the buffer reservoir rises further, the level of the milk will reach the lowest point 30 of the outflow opening 28. As soon as the milk level gets higher, the buffer reservoir will start to empty via the outflow opening 28. During measurement, the level of the milk is thus equal to, or higher than, the lowest point 30. The height of the lowest point 30 is chosen such that during measurement the float will always float properly. The milk flowing out via the outflow opening 28 will flow via the outflow channel 32 to the outlet 4. When the milk level in the milk meter rises further, a larger portion of the outflow opening 28 will be below the milk level. As a result, the magnitude of the flow rate of the milk that flows through the outflow opening 28 will increase. Eventually, an equilibrium will be established between the supply of milk to the buffer reservoir and the amount of milk that leaves the buffer reservoir. This equilibrium is then also associated with a particular height of the level of the milk in the buffer reservoir. This equilibrium and hence the height of the liquid surface of the milk (here also called the level) depends on the magnitude of the flow rate at which the milk is being supplied to the inlet 2. When the flow rate of the milk that is supplied to the inlet 2 increases, there will be a short period of time in which the flow rate through the outflow opening 28 is smaller than the flow rate of the milk through the inlet. The result is that the milk level in the buffer reservoir will rise. The result of this is that the flow rate through the outflow opening 28 will increase (because a larger part of the outflow opening is below the milk level) until an equilibrium is established again between supply and discharge of milk in the buffer reservoir. When the flow rate of the milk that is supplied to the inlet 2 decreases, there will be a short period of time in which the flow rate of the milk that flows through the outflow opening 28 is greater than the flow rate of the milk that flows through the inlet. The consequence is that the milk level in the buffer reservoir will fall, as a result of which the flow rate through the outflow opening will decrease (in that a smaller part of the outflow opening is below the level of the milk (the milk surface) in the buffer reservoir) until an equilibrium is established again between supply and discharge of milk in the buffer reservoir. The milk level in the stabilization chamber (the height of the liquid surface of the milk in the stabilization chamber) will follow the milk level of the buffer reservoir. The height at which the float is floating is measured by the sensor device 10. Because the height at which the float is floating within the stabilization chamber, in turn, is determined by the flow rate of the milk flow, in this manner information about the flow rate is obtained. To put it differently, the flow rate is measured in this manner.

In particular, the stabilization chamber and the buffer reservoir are each further provided with relatively small outlet openings 22 and 46 which have no influence on the measurement because through these openings only a relatively small portion of the milk can flow out of the stabilization chamber and the buffer reservoir, respectively. These openings, so-called drainage openings, are provided to ensure that after use the stabilization chamber and the buffer reservoir can slowly empty via the outlet 4. These openings may also be each provided with a valve unit for opening and closing the drainage openings. The valve unit of the opening 46 is indicated by way of example in FIG. 2A with reference numeral 47.

The invention is not in any way limited to the above-outlined embodiment. Thus, the stabilization chamber and/or the outflow channel may for instance each have the shape of a rectangular bar instead of a cylinder. The float can then likewise be of rectangular design. In this example, the stabilization chamber 6, the buffer reservoir 24, the outflow channel 32 and the fluid connection 36 are of a plastic. This provides the advantage that these parts do not influence the magnetic field.

The milk meter according to FIGS. 1A-D, as has been mentioned, is further provided with valve 100. The valve 100 can selectively take up a first or second valve position where in the first valve position at least a first part 5.1 of the liquid path 5 is open and in the second valve position at least the first part 5.1 of the liquid path 5 is closed. The first part 5.1 of the liquid flow path in this example is the part of the liquid flow path 5 that extends upstream of the valve through the outflow channel 32. That part of the liquid flow path 5 that extends from the inlet 2 to the outlet 4 via the drainage openings 22 and 46 hence cannot be closed off by the valve 100 and this concerns, respectively, a second part 5.2 (via drainage opening 22) and third part 5.3 (via drainage opening 46) of the liquid flow path 5.

The valve is provided with an operating opening 103, the milk meter being configured such that:
  if at the operating opening a first pressure prevails and upstream of the valve 100 in the liquid flow path 5 a second pressure prevails, with the first pressure being higher than the second pressure and the difference between the first and the second pressure being greater than a first predetermined value, the valve 100 takes up the first valve position;
  if at the operating opening 103 a third pressure prevails and upstream of the valve in the liquid flow path a fourth pressure prevails, with the difference between the third pressure and the fourth pressure being less than a predetermined second value, and the third pressure and the fourth pressure each being less than the first pressure, the valve 100 is in the second valve position; and
  if at the operating opening 103 a fifth pressure prevails and upstream of the valve in the liquid flow path a sixth pressure prevails, with the difference between the fifth pressure and the sixth pressure being less than a predetermined third value, and the fifth pressure and the sixth pressure each being greater than the second pressure, the valve is in the second valve position. The operating opening 103 in this example is connected to a schematically shown pressure selection means 200 with which selectively a pressure at the operating opening can be set. During milking, as has been mentioned, the second pressure will be a relatively low pressure P2 (lower than the atmospheric pressure P1) which in technical jargon is also referred to as the vacuum pressure of a milking system. With the pressure selection means 200, then, as a pressure at the operating opening 103, an atmospheric pressure P1 is selected as the first pressure. The consequence is that the valve 100 is open and milk can flow through the valve as discussed above. If the milk meter is not used, it will empty via the outflow channel 32 and the drainage openings 22 and 46.

If the milk meter 2 is empty, it can be cleaned. In that case, upstream of the valve in the liquid flow path the fourth pressure will prevail which in this example is equal again to the vacuum pressure P2 mentioned above. In this example, with the pressure selection means 200, as a third pressure at the operating opening a pressure will be selected which in this example is also about equal to the vacuum pressure P2. The result is that the valve 100 will close. Now that the valve is closed, via the inlet 2 a cleaning liquid known per se can be introduced into the milk meter to clean the milk meter. This liquid can then remain in the buffer reservoir 24, stabilization chamber 6 and outflow channel 32 for a while. After the cleaning action of the cleaning liquid, with the pressure selection unit, the first pressure is selected again and upstream of the valve the second pressure prevails again, which is equal to the fifth pressure in this example. As a result, the valve will open again, so that the cleaning liquid can flow out of the milk meter via the outflow channel and the outlet.

If the milk meter is at rest and is not used, in this example a fifth pressure is selected with the pressure selection means 200, which is equal to the atmospheric pressure P1. Also, as sixth pressure a pressure is selected that is equal to the atmospheric pressure P1. This last can be realized by switching off the milking plant to which the milk meter is coupled. As a result, the reduced pressure in the milk meter (so, in inter alia the buffer reservoir, stabilization chamber and outflow channel 32) will vanish and take a value that is also equal to the atmospheric pressure. The pressure at the entry is then the fifth pressure and the pressure upstream of the valve 100 is then the sixth pressure. The valve will then close. The milk meter is presently in a condition that is denoted as rest: the milk meter 1 is not used and the valve 100 is closed. In this example, therefore, it holds that the first pressure, fifth pressure and sixth pressure are equal to each other. Here it holds, in this example, that the first pressure is an atmospheric pressure. An advantage is that the first and fifth pressure can be simply selected with the pressure selection means. To this end, the pressure selection means 200 may for instance comprise a valve which is opened to connect the operating opening 103 with the surroundings of the milk meter.

Further, it holds in this example that the second pressure, third pressure and fourth pressure are equal to each other. In that regard, it holds, furthermore, that the second pressure is a vacuum pressure of a value that prevails in a milking system 1. An advantage is that the third pressure can be simply selected with the pressure selection means 200. To this end, the pressure selection means 200 may for instance comprise a (second) valve which is opened to connect the operating opening 103 with, for example, a top of the buffer reservoir through a connection 300 (see FIG. 2A) where in use the vacuum pressure concerned prevails. Accordingly, it holds, in particular, that the vacuum pressure is a vacuum pressure that, in use, prevails upstream of the valve 100 in the liquid path 5 and/or that the vacuum pressure is a reduced pressure with respect to the atmospheric pressure. This vacuum pressure, of course, can also be derived elsewhere in the milking system outside of the milk meter for control of the operating opening with the pressure selection means 200.

Figure 3:
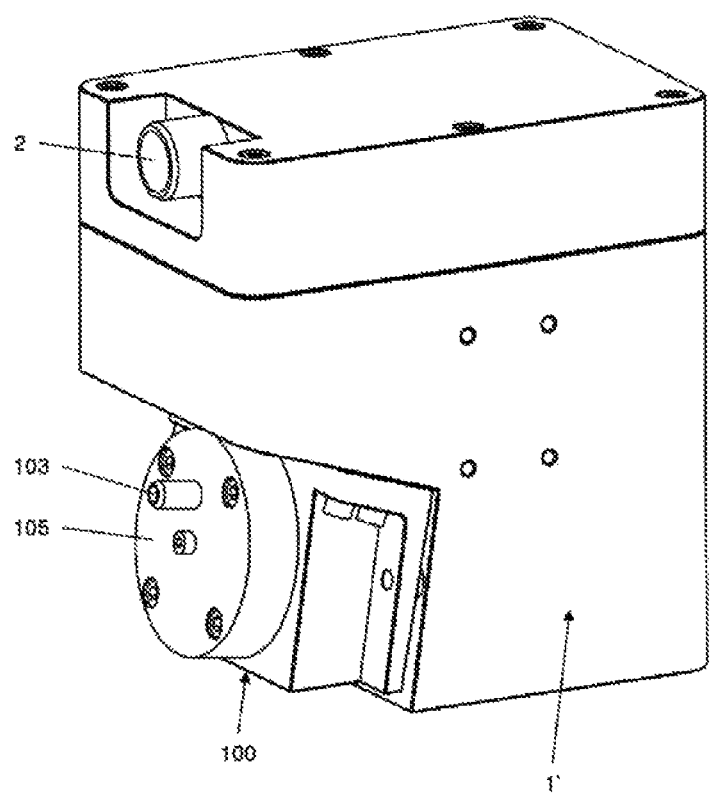
FIG. 3 shows a view of a second alternative embodiment of a milk meter according to the invention.
Figure 4:
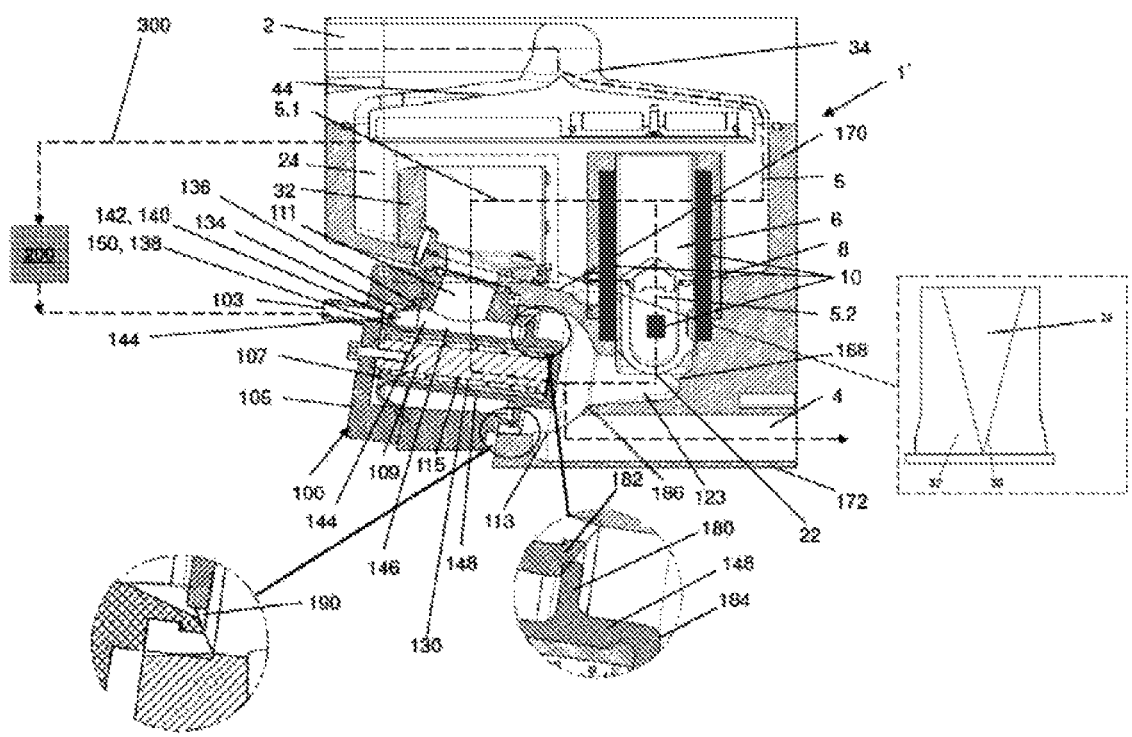
FIG. 4 shows a cross section of the milk meter according to FIG. 3 in which a valve takes up a second valve position.
Figure 5:
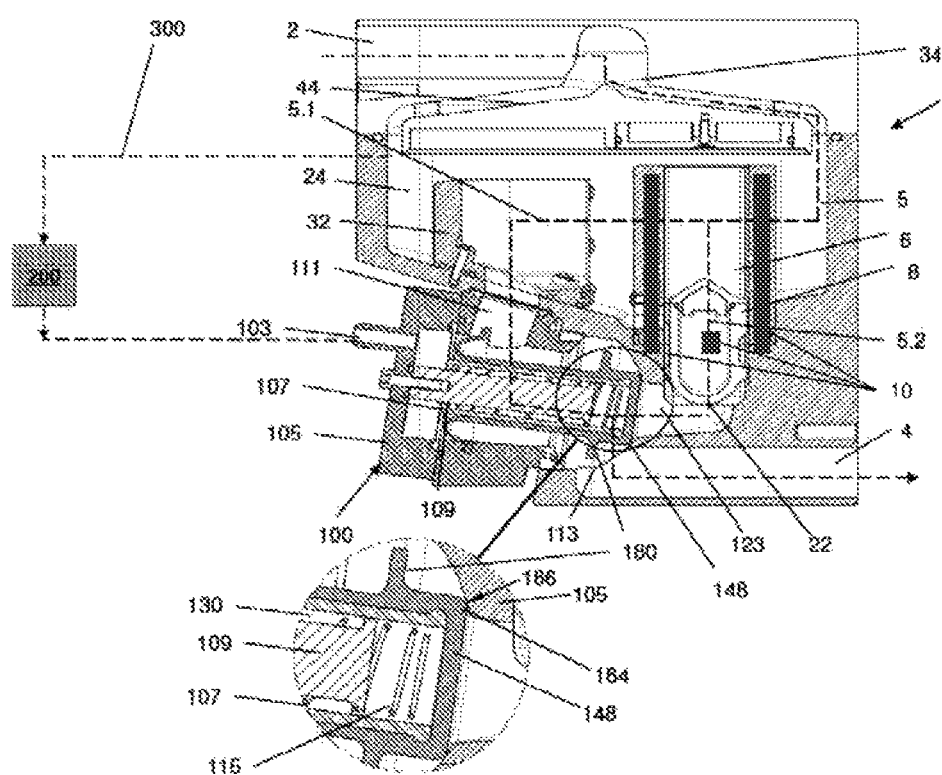
FIG. 5 shows a cross section of the milk meter according to FIG. 7 in which a valve takes up a first valve position.
Figure 7:
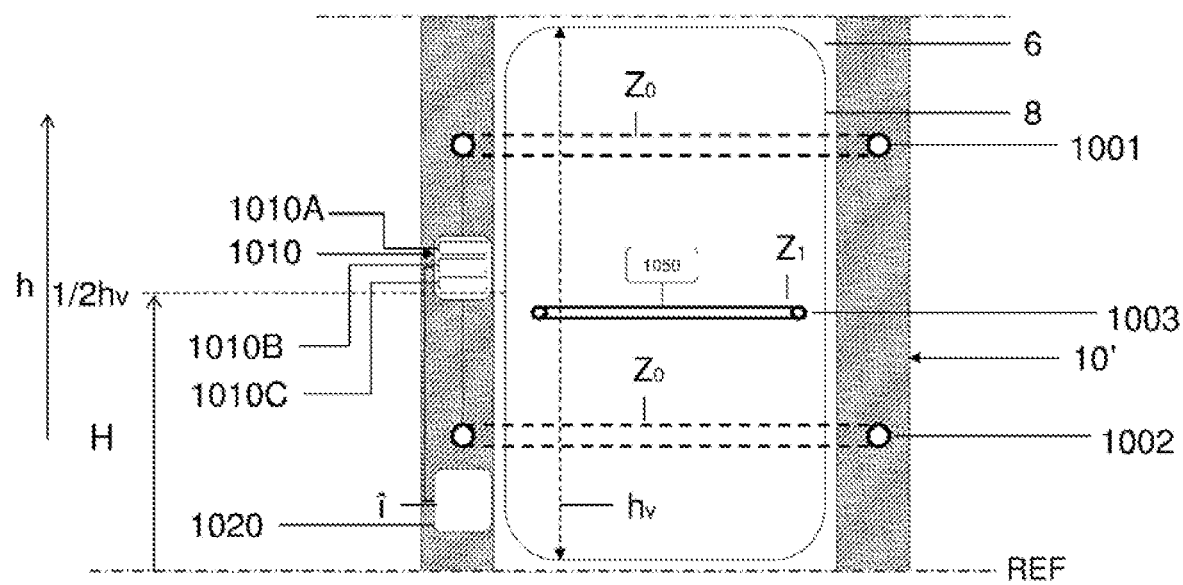
FIG. 7 schematically shows a part of the milk meter according to FIG. 1 or FIG. 3 wherein the sensor device according to a second embodiment thereof is shown in more detail.
Figure 8:
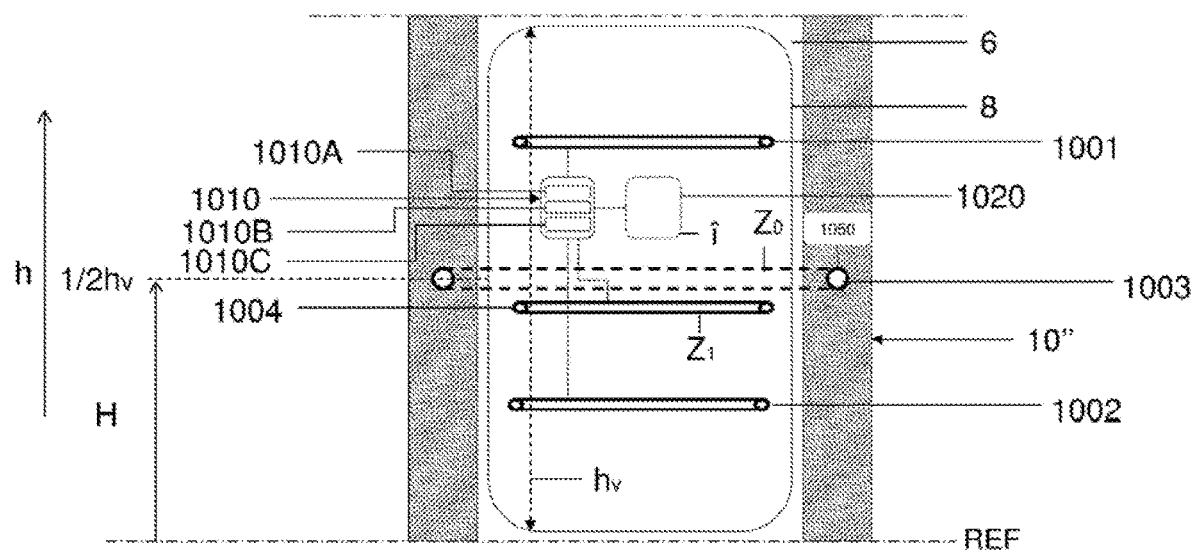
FIG. 8 schematically shows a part of the milk meter according to FIG. 1 or FIG. 3 wherein the sensor device according to a third embodiment thereof is shown in more detail.
Figure 9:
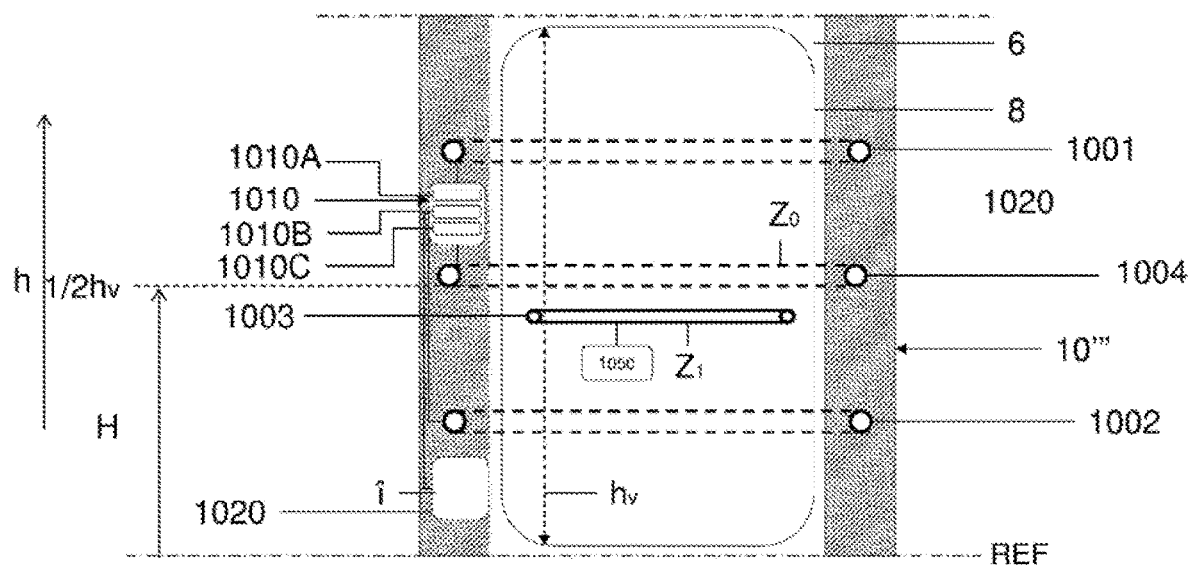
FIG. 9 schematically shows a part of the milk meter according to FIG. 1 or FIG. 3 wherein the sensor device according to a fourth embodiment thereof is shown in more detail.

In FIGS. 3-5 a second embodiment according to the invention is disclosed, where mutually corresponding parts in FIGS. 1A-D and FIGS. 2A and B and FIGS. 3-5 are provided with the same reference numerals. In FIGS. 7-9 the float 8 and the sensor device 10 may be implemented in accordance with each of the above-mentioned embodiments. FIGS. 3-5 are especially about the particular embodiment of the valve 100 and the position where it has been incorporated within the milk meter.

The valve 100 is provided with a housing 105 in which a cylinder 107 is included, a piston 109 which is included in the cylinder 107, a first inlet opening 111 and an outlet opening 113, while the piston 109 and the cylinder 107 can move relative to each other between a first and second position. The valve 100 is furthermore provided with a spring element 115 which presses the cylinder 107 and the piston 109 relative to each other in the direction of the second position. In the first position, the valve 100 takes up the first valve position where a first fluid connection between the first inlet opening 111 and the outlet opening 113 is cleared (FIG. 9). In the second position, the valve takes up the second valve position where the first fluid connection between the first inlet opening 111 and the outlet opening 113 is blocked (FIG. 4). Blocking does not preclude there being a drainage opening 190 present, as will be set out hereinafter.

The operating opening 103 is in fluid communication with a space 130 within the cylinder 107. The inlet opening 111 is in fluid communication with a space 132 outside the cylinder within the housing 105. A pressure at the operating opening 103 which is greater than a pressure that prevails in the space 132 present within the housing 105 and outside the cylinder 107 presses the cylinder and the piston relative to each other in the direction of the first position against the force of the spring element 115. The first predetermined value is therefore a pressure difference which generates a force which presses the cylinder and the piston relative to each other to the first position and which is greater than the force of the spring element between the cylinder and the piston. In particular, the first predetermined value is in the range of 0.4-1, preferably in the range of 0.5-0.8.

Furthermore, in particular, the second predetermined value is in the range of 0-0.5, preferably in the range of 0-0.3. Preferably, the third predetermined value is in the range of 0-0.5, preferably in the range of 0-0.3. In this example, the piston 109 is fixedly connected with the housing 105 of the valve 100. The valve is furthermore provided with a flexible ring 134 of which an outer edge 136 is connected, in particular detachably, with the housing 105 of the valve 100 and of which an inner edge 138 is connected with an outer side of the cylinder 107, such that a space 140 (which is in fluid communication with the space 130 within the cylinder) contiguous to a first side 142 of the ring is in fluid communication with the operating opening, and a space 144 (which is formed by the space 132 outside the cylinder) contiguous to a second side 146 of the ring opposite the first side is in fluid communication with the first fluid connection.

The flexible ring 134 is connected with a flexible sleeve 148 in which at least a part of the cylinder 107 is included, while an opening 150 of the sleeve 148 and the inner edge 138 of the ring are connected with each other. In this example, the flexible ring 134 and the sleeve 148 are made in one piece.

Furthermore, it holds in this example that the ring and/or the sleeve are made of silicones.

In this example, it holds furthermore that the first inlet opening 111 of the valve 100 is in fluid communication with the outflow opening 28 of the buffer reservoir 24, and the outlet opening 113 of the valve 100 is in fluid communication with the outlet 4 of the milk meter, the first part 5.1 of the liquid flow path 5 extending from the outflow opening 28 of the buffer reservoir to the outlet 4 of the milk meter. In the second valve position, the liquid path 5.1 is closed (FIG. 4) in that a circumferential edge 180 of the sleeve 148 closes off on a part 182 of the housing. Though, still, effectively a drainage opening 190 is present between the circumferential edge 180 of the sleeve 148 and the part 182 of the housing.

The valve 100 functionally also comprises a part of the housing of the milk meter and in that regard is furthermore provided with a second inlet opening 123 which is in fluid communication with the drainage opening 22 of the stabilization chamber 6, while in the first valve position at least the second part 5.2 of the liquid path 5 is closed in that a part 184 of the sleeve 148 closes off on a part 186 of the housing 105 of the valve. In the second valve position (FIG. 8), at least the second part 5.2 of the liquid path 5 is open. In the first valve position (FIG. 9), the liquid path 5.2 is closed. The second part of the liquid path 5, as mentioned, extends through the drainage opening of the stabilization chamber 6 to the outlet 4 of the milk meter 1.

In the first position (FIG. 5), the valve takes up the first valve position where a second fluid connection between the second inlet opening 111 of the valve 100 and the outlet opening 113 of the valve 100 is open. In the second position (FIG. 4), the valve 100 takes up the second valve position where the second fluid connection between the second inlet opening 123 and the outlet opening 113 is cleared. The first fluid connection of the valve 100 hence lies in the first part 5.1 of the liquid flow path 5 of the milk meter. The second fluid connection of the valve 100 hence lies in the second part 5.2 of the liquid flow path 5 of the milk meter.

In this example, it holds furthermore that a bottom 168 of the stabilization chamber is at a lower level than a bottom 170 of the buffer reservoir and/or a bottom of the outflow channel 32. Furthermore, it holds that the valve is under the buffer reservoir and at a higher level than a lowest point 172 of the outlet. In this way, the milk meter is compactly implemented.

Presently, referring to the next FIGS. 6 and 6A-9, the sensor device 10 which is configured for determining the position H (height) of the float will be further elucidated. The position H indicates the position of the half height ½ $h_v$ of the float with respect to a reference REF.

Figure 6:
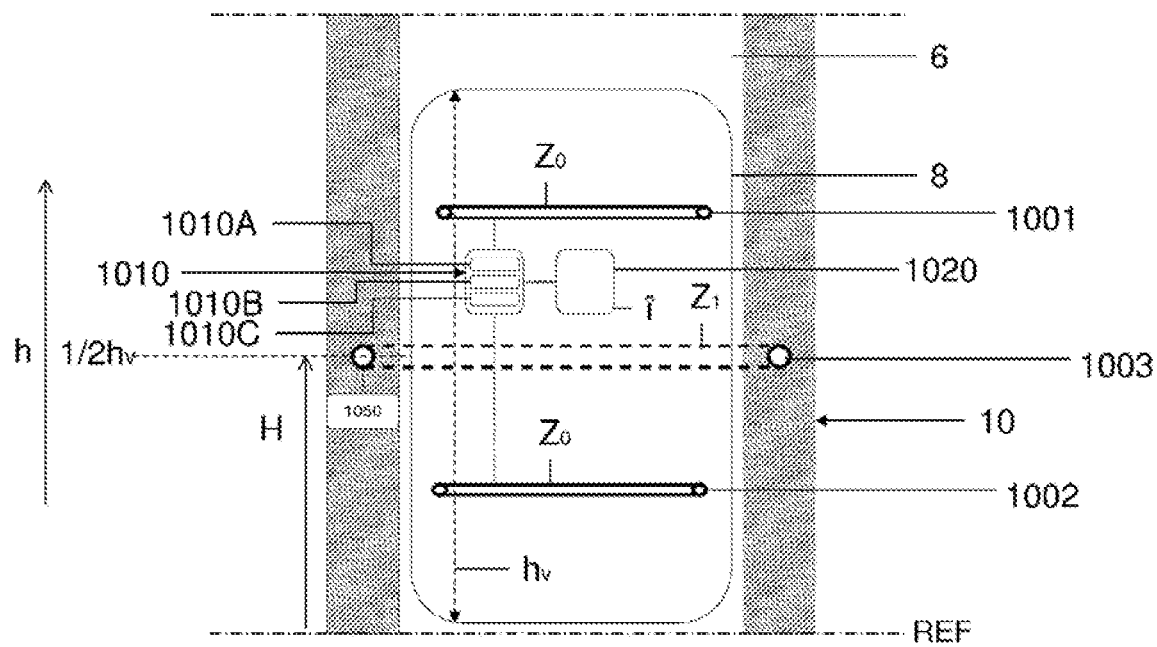
FIG. 6 schematically shows a part of the milk meter according to FIG. 1 or FIG. 3 wherein the sensor device according to a first embodiment thereof is shown in more detail.

FIG. 6 shows a portion comprising the sensor device 10 of a milk meter 1 according to a first embodiment. The sensor device 10 is provided with a first coil 1001 and a second coil 1002. This first and second coil are mounted in or on the float 8. The first coil 1001 and second coil 1002 are spaced apart and in a height direction h have a mutual distance of 10-100%, in this example of 50-90%, of the vertical length $h_v$ of the float 8. A third coil 1003 is mounted in or on a wall of the stabilization chamber 6 and extends, seen from above, around the float 8. The position of the third coil on the one hand and the positions of the first and second coil on the other hand change with respect to each other when the float 8 moves up or down in the stabilization chamber 6. The coils 1001, 1002, 1003 are so mounted that the axial axes of the coils coincide. The coils 1001, 1002, 1003 are further also so directed that the axial axes extend in the direction in which the float 8 can move up and down within the stabilization chamber 6. The milk meter 1 is further provided with a controller 1010 which is mounted within the float.

The principle of the operation is as follows. By measuring the coupling of coil 1001 in the float with the external coil 1003 and also the coupling of the coil 1002 in the float with this external coil 1003, the position of the float with respect to the external coil can be computed. For this purpose, the float is constructed such that upon a movement through the external coil, the coupling in the measuring range with the first coil increases, while the coupling with the second coil, by contrast, decreases. Upon movement of the float in the other direction, also the increase and decrease of the coupling is reversed. In FIG. 6, the situation is indicated where the coupling between the external coil 1003 and coil 1001 is equal to the coupling between coil 1002 and the external coil 1003. If the external coil produces an alternating magnetic field, the induced voltage in coil 1001 will be equal to the induced voltage in coil 1002. The voltage on both coils can be accurately measured with an appropriate measuring instrument (AC voltmeter, in this example with the controller). Now, when the measured values of coil 1001 and coil 1002 are divided into each other, this results in a number that is independent of the magnitude of the current through the external coil and any (homogeneous) noise received by coils 1001 and 1002. In the example of FIG. 6, the quotient of the measured values of coil 1001 and 1002 will have the value 1, because the coupling with the external coil 1003 is equal for both coils 1001 and 1002.

Figure 6A:
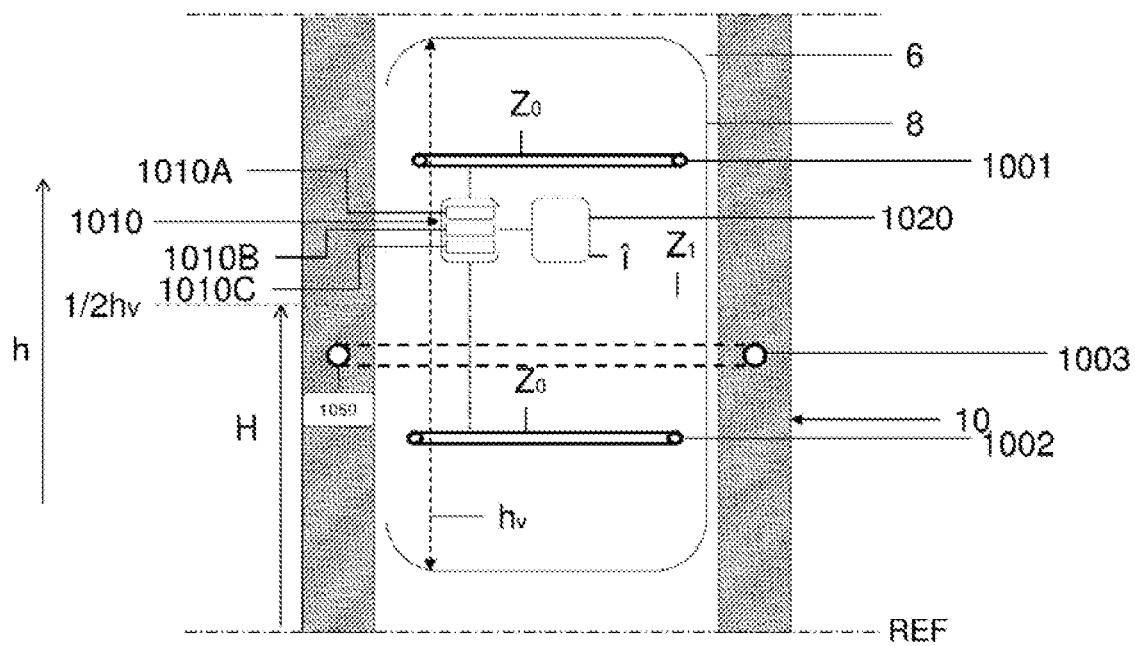
FIG. 6A schematically shows a part of the milk meter according to FIG. 6 wherein the float has moved up with respect to the situation in FIG. 6.

If the float moves up, the situation as represented in FIG. 6A arises. In the situation of FIG. 6A, the coupling between the external coil 1003 and coil 1001 is much smaller than the coupling between coil 1002 and the external coil 1003. The measured voltage across coil 1001 as a result of a transmitting signal emitted with the external coil is therefore also smaller in coil 1001 than the value in coil 1002. This results in a quotient value of U (coil 1001)/U (coil 1002)<1. If the float moves down with respect to the situation in FIG. 6A, the reverse occurs and the above-mentioned quotient will be greater than 1.

Figure 12:
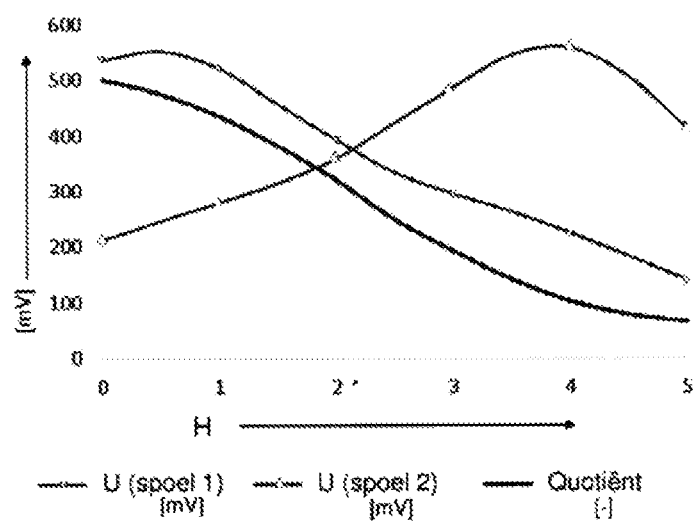
FIG. 12 shows the signal U (coil 1001), the signal U (coil 1002) and the quotient U (coil 1001)/U (coil 1002)

The measuring system thus provides a number that indicates the relative position of the float with respect to the external coil 1003. As long as the external coil is between coil 1001 and coil 1002, the logarithm of the measured value will have a substantially linear relationship with the position of the float. If the float can come so high or low that both coils 1001, 1002 are above or below the external coil 1003, the measuring system will still provide a useful outcome. The only condition then is that the variation of the above-mentioned coupling as a function of the position of the float for coil 1001 is different from that for coil 1002. This provides the advantage that the float can be built relatively compactly in proportion to the desired measuring range. FIG. 12 gives an example of the measuring range as a function of the position of the float.

The coil 1003 may be connected with a transmitter to emit the transmitting signal. This transmitter is not shown in FIG. 6A.

For an efficient measuring system, virtually all electronics is mounted in the float. To be able to measure the external coil then, from the float, in short pulses, a signal is sent to the external coil. This proceeds as follows: The coils 1001 and/or 1002 are initially fed with a transmitting signal, consisting of an alternating magnetic field. As a result of this, the external coil is brought into resonance, exactly on the frequency that is transmitted by the coils 1001 and/or 1002. After some time, the external coil 1003 resonates and the coils 1001 and 1002 are then used only for reception of the signal emitted by the external coil 1003. Because at this point the drive of the third coil 1003 has gone, this signal will look like an alternating voltage whose amplitude diminishes according to a logarithmic curve. This, however, is not a problem, because by virtue of the quotient of the two measured values, the amplitude of the signal of the external coil is not relevant.

Practically speaking, the measuring sensor is further implemented as follows. The controller 1010 is configured to be in communicative connection with the first coil and the second coil for, in use, emitting with the first coil and/or second coil an active transmitting signal $Z_0$ to the third coil during a first predetermined period. The controller 1010 then works as a transmitter and to that end comprises transmitter means 1010A. This first predetermined period can have, for example, a time length of 10-1000 microseconds. The third coil 1003 is arranged as part of an electromagnetic resonant circuit and to that end is connected with a capacity 1050. The transmitting signal $Z_0$ has a frequency that corresponds to the resonant frequency of the resonant circuit which the third coil 1003 is part of. Accordingly, the third coil 1003 is able to receive the transmitting signal $Z_0$ and passively emit it as a passive attenuating transmitting signal $Z_1$ when the active transmitting signal $Z_0$ has stopped. The controller 1010 then works as a receiver and to that end comprises receiver means 1010B. To this end, the controller 1010 is configured, in use during a second predetermined period which follows the first predetermined period, not to emit the transmitting signal $Z_0$ and instead to use the first and the second coil as receiver for receiving the attenuating passive transmitting signal still being latently emitted via the third coil. The second predetermined period in this example has a time length of 10-1000 microseconds. The controller 1010 is additionally configured to serve as signal processing means and to that end comprises signal processing means 1010C. The controller 1010 is configured, on the basis of the receiving signal which is generated by the first coil upon reception of the transmitting signal $Z1$ and the receiving signal which is generated by the second coil upon reception of the transmitting signal $Z1$, to determine the position of the float 8 with respect to the third coil 1003 and thereby with respect to the stabilization chamber 6 in the height direction h. The controller 1010 in this example is also configured, on the basis of the determined position of the float 8 with respect to the third coil 1003, to determine the magnitude of the liquid flow rate of the milk flow passing in the milk meter 1, 1'. The third coil 1003 is so positioned that, for the measuring range of interest, it moves between the first and the second coil. In particular, the third coil, during use, is at an equal distance from the first and the second coil if the flow rate of the milk is equal to the middle of the measuring range of interest. In the milk meter 1, 1' described here, the position of the float 8 is a function of the ratio between the receiving signal that is received by the first coil upon reception of the transmitting signal $Z1$ and the receiving signal that is received by the second coil upon reception of the transmitting signal $Z_1$. The controller is configured, in use and during the second predetermined period, to determine the decimal logarithm of said ratio and use it as input in a calculation for determination of the position of the float. If the third coil 1003 in the height direction h is between the first and the second coil, then, during the second period, the decimal logarithm, of the ratio between the strength of the receiving signal of the first coil and the receiving signal of the second coil, is in a substantially linear relationship with the position of the float. The decimal logarithm, of the ratio between the strengths of the received signals, has a virtually polynomial relationship with the position of the float when the third coil 1003 is not in between the first and the second coil. In that range too, therefore, the flow rate can be determined with the meter. In this example, the controller 1010 is provided within the float 8. An electrical energy source, such as a battery (not represented, but conventional), is also present for providing electrical energy to controller 1010. In this example, the electrical energy source is in the float. Irradiating the third coil with the transmitting signal and then determining the position of the float may, during use, repeat itself in a series of successive first and second periods. Entirely optionally, the controller is provided with a communication means 1020. In this example, the communication means is wireless, such as a transmitter unit known per se, for example a radio transmitter, UHF transmitter, or Bluetooth transmitter for wirelessly emitting a signal i which comprises information about the determined flow rate, for example to a user interface (not represented, but conventional). In this example, the communication means 1020 is then also provided within the float.

The float in this example is of exchangeable design, so that it can be replaced when, for example, the energy source is empty or when the electronics needs to be updated.

FIG. 7 schematically shows an alternative embodiment of the sensor device 10' according to FIG. 6. In FIGS. 6 and 7, mutually corresponding parts are provided with a same reference numeral. Furthermore, only differences with respect to the embodiment of FIG. 6 will be discussed. In the milk meter, the first coil and the second coil are mounted in or on the wall of stabilization chamber 6. The third coil is mounted in or on the float 8. In this example, the controller 1010 as well as the energy source is provided in or on the wall of the stabilization chamber 6. In this example, in addition, also, optionally, the communication means 1020 is provided in or on the wall of the stabilization chamber 6. Also in this variant, it holds that the position of the first and second coils on the one hand with respect to the position of the third coil on the other hand varies when the float moves up or down in the stabilization chamber 6 in the direction h. Here too, during the first period, an active transmitting signal is emitted with the first and second coil and during the second period an attenuating passive transmitting signal is emitted with the third coil and received with the first and second coil. By the controller 1010, on the basis of the receiving signals of the first and second coil during the second period the position (in the height direction h) of the third coil 1003 and thereby the position of the float is determined by the controller 1010 with respect to the position of the first and second coil and thereby with respect to the position of the stabilization chamber. The operation of the sensor device 10 in this variant is otherwise the same as described on the basis of FIG. 6. From the receiving signals of the first and second coil, as discussed in relation to FIG. 6, by the controller 1010, the position (height) of the first and second coil (and hence in this example the position of the float) with respect to the position of the third coil (and hence in this example with respect to the stabilization chamber) can be determined. Also, the flow rate can be determined from this by the controller 1010.

FIG. 8 shows a schematic alternative embodiment of the sensor device 10" according to FIG. 6. In FIGS. 6 and 8, mutually corresponding parts are provided with a same reference numeral. Furthermore, only differences with respect to the embodiment of FIG. 6 will be discussed. In this example, the sensor device 10" is provided with a fourth coil 1004 which is mounted in or on the float 8. The fourth coil in this example is in between the first and the second coil, for example at an equal distance from the first and second coil. The fourth coil is so directed that the axial axis of the fourth coil coincides with the axial axis of the first, second and third coil. The controller 1010 is configured to be in communicative connection with the fourth coil 1004 for, in use, during the first predetermined period, transmitting with the fourth coil 1004 the active transmitting signal $Z_0$ which is thereupon received by the third coil. The third coil 1003 is again configured as part of an electromagnetic resonant circuit as discussed in relation to FIG. 6. To this end, the third coil 1003 is able to receive the transmitting signal $Z_0$ during the first predetermined period and then, during the second predetermined period, to passively emit it as the attenuating transmitting signal Z1. The controller 1010 is further configured, in use, during the second predetermined period, not to emit the transmitting signal $Z_0$ with the fourth coil, and to receive with the first and the second coil the passively emitted transmitting signal Z1. Here too, during the first period an active transmitting signal is emitted (now with the fourth coil instead of with the first and/or second coil) and during the second period an attenuating passive transmitting signal is emitted with the third coil and received with the first and second coil. By the controller 1010, on the basis of the receiving signals of the first and second coil during the second period, the position (in the height direction h) of the third coil 1003 and hence the position of the stabilization chamber is determined by the controller 1010 with respect to the position of the first and second coil and hence with respect to the position of the float. The operation of the sensor device 10 in this variant is otherwise the same as described on the basis of FIG. 6. From the receiving signals of the first and second coil, as discussed in relation to FIG. 6, by the controller 1010, the position (height) of the first and second coil (and hence in this example the position of the float) with respect to the position of the third coil (and hence in this example with respect to the stabilization chamber) can be determined. Also, the flow rate can be determined from this by the controller 1010.

FIG. 9 shows a schematic alternative embodiment of a sensor device 10''' according to FIG. 8. In FIGS. 8 and 9, mutually corresponding parts are provided with a same reference numeral. Furthermore, only differences with respect to the embodiment of FIG. 8 will be discussed. In the sensor device 10''', the first coil, the second coil and the fourth coil are mounted in or on the wall of the stabilization chamber 6. The third coil is mounted in or on the float 8. In this example, the controller 1010 as well as the energy source is provided in or on the wall of the stabilization chamber 6. In this example, in addition, also, optionally, the communication means 1020 is provided in or on the wall of the stabilization chamber 6. In this variant too, it holds that the position of the first and second coils on the one hand with respect to the position of the third coil on the other hand varies when the float moves up or down in the stabilization chamber in the direction h.

Here too, just as with the variant in FIG. 8, during the first period an active transmitting signal is emitted with the fourth coil and during the second period an attenuating passive transmitting signal is emitted with the third coil and received with the first and second coil. By the controller 1010, on the basis of the receiving signals of the first and second coil during the second period, the position (in the height direction h) of the third coil 1003 (and hence in this example the position of the float) is determined by the controller 1010 with respect to the position of the first and second coil (and hence in this example with respect to the position of the stabilization chamber). The operation of the sensor device 10 in this variant is otherwise the same as described on the basis of FIG. 8.

Figure 10:
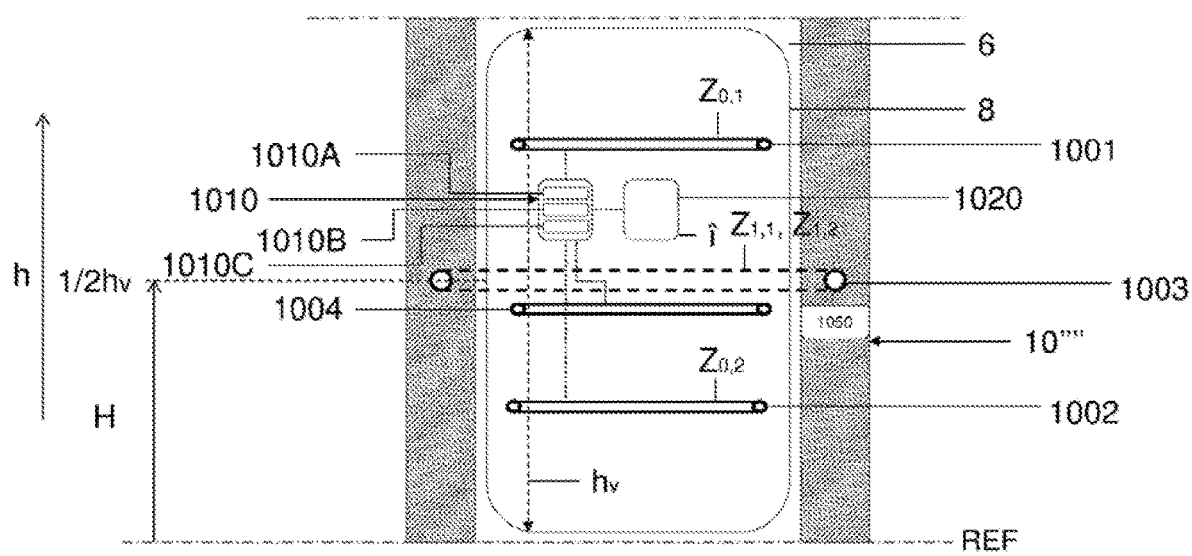
FIG. 10 schematically shows a part of the milk meter according to FIG. 1 or FIG. 3 wherein the sensor device according to a fifth embodiment thereof is shown in more detail.

FIG. 10 shows a schematic alternative embodiment of a sensor device 10'''' according to FIG. 6. In FIGS. 6 and 10, mutually corresponding parts are provided with a same reference numeral. In this example, the sensor device 10'''' is further provided with a fourth coil 1004 which is mounted in the float 8. The fourth coil is so directed that the axial axis of the fourth coil coincides with the axial axis of the first, second and third coil. The controller 1010 is configured to be in communicative connection with the first coil for, in use, supplying a transmitting signal $Z_{0,1}$ to the third coil 1003 during, for example, a first predetermined period. The controller 1010 is further also configured to be in communicative connection with the second coil for, in use, supplying a transmitting signal $Z_{0,2}$ to the third coil 1003 during, for example, a third predetermined period. The transmitting signals $Z_{0,1}$ and $Z_{0,2}$ each have a frequency that corresponds to the resonant frequency of the resonant circuit which the third coil 1003 is part of.

First, for example, the transmitting signal $Z_{0,1}$ is emitted during the first predetermined period and then the transmitting signal $Z_{0,2}$ is emitted during the third predetermined period. The third coil 1003 is here again configured as part of an electromagnetic resonant circuit. To this end, the third coil 1003 is able to receive the transmitting signal $Z_{0,1}$ during the first period and store the energy thereof in the resonant circuit, and thereupon, on the basis of this energy, during a second predetermined period which is in between the first and third period, to emit a passive attenuating transmitting signal $Z_{1,1}$ when the emission of the active transmitting signal $Z_{0,1}$ has stopped.

The third coil 1003 is further also able to receive the transmitting signal $Z_{0,2}$ during the third period and store the energy thereof in the resonant circuit and thereupon, on the basis of this energy, during a fourth predetermined period which is after the third period, to emit a passive attenuating transmitting signal $Z_{1,2}$ when the emission of the active transmitting signal $Z_{0,2}$ has stopped. The signal received during the second period with the fourth coil 1004 and the signal received during the fourth period with the fourth coil 1004 can be processed in combination by the controller 1010 again to determine the position of the first and second coil with respect to the position of the third coil 1003 (and hence the position of the float with respect to the stabilization chamber and hence the flow rate). This can, again, be carried out by the controller 1010, by dividing into each other the signals received with the coil 1004 in the second and fourth period, respectively, whereby the received signal during the first period, for the purpose of making the division, has been delayed by a time duration that is equal to the time duration of the first and second period.

Figure 11:
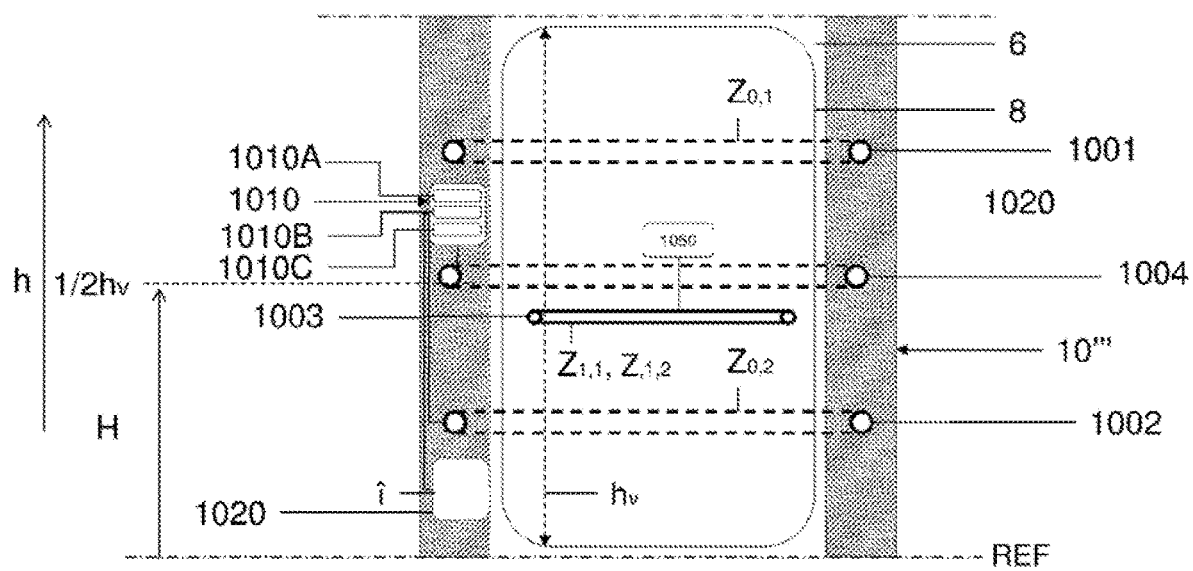
FIG. 11 schematically shows a part of the milk meter according to FIG. 1 or FIG. 3 wherein the sensor device according to a sixth embodiment thereof is shown in more detail.

FIG. 11 shows a schematic alternative embodiment of a sensor device''''' according to FIG. 10. In FIGS. 10 and 11, mutually corresponding parts are provided with a same reference numeral. In the sensor device 10''''', the first coil, the second coil and the fourth coil are mounted in or on the wall of the stabilization chamber 6. The third coil is mounted in or on the float 8. In this example, the controller 1010 as well as the energy source is provided in or on the wall of the stabilization chamber 6. In this example, in addition, also, optionally, the communication means 1020 is provided in the wall of the stabilization chamber 6. The operation is as follows. The controller 1010 is configured to be in communicative connection with the first coil for, in use, supplying a transmitting signal $Z_{0,1}$ to the third coil 1003 during, for example, a first predetermined period. The controller 1010 is further also configured to be in communicative connection with the second coil for, in use, supplying a transmitting signal $Z_{0,2}$ to the third coil 1003 during, for example, a third predetermined period which is after the first period. The transmitting signals $Z_{0,1}$ and $Z_{0,2}$ each have a frequency that corresponds to the resonant frequency of the resonant circuit which the third coil 1003 is part of.

First, for example, the transmitting signal $Z_{0,1}$ is emitted during the first predetermined period and then the transmitting signal $Z_{0,2}$ is emitted during the third predetermined period. The third coil 1003 is here again arranged as part of an electromagnetic resonant circuit. To this end, the third coil 1003 is able to receive the transmitting signal $Z_{0,1}$ during the first period and store the energy thereof in the resonant circuit, and thereupon, on the basis of this energy, during a second predetermined period which is in between the first and third period, to emit a passive attenuating transmitting signal $Z_{1,1}$ when the emission of the active transmitting signal $Z_{0,1}$ has stopped.

The third coil 1003 is further also able to receive the transmitting signal $Z_{0,2}$ during the third period and store the energy thereof in the resonant circuit and thereupon, on the basis of this energy, during a fourth predetermined period which is after the third period, to emit a passive attenuating transmitting signal $Z_{1,2}$ when the emission of the active transmitting signal $Z_{0,2}$ has stopped. The signal received during the second period with the fourth coil 1004 and the signal received during the fourth period with the fourth coil 1004 can be processed in combination by the controller 1010 again to determine the position of the first and second coil with respect to the position of the third coil 1003 (and hence the position of the float with respect to the stabilization chamber and hence the flow rate). This can, again, be carried out by the controller 1010, by dividing into each other the signals received with the coil 1004 in the second and fourth period, respectively, whereby the received signal during the first period, for the purpose of making the division, has been delayed by a time duration that is equal to the time duration of the first and second period.

Figure 13:
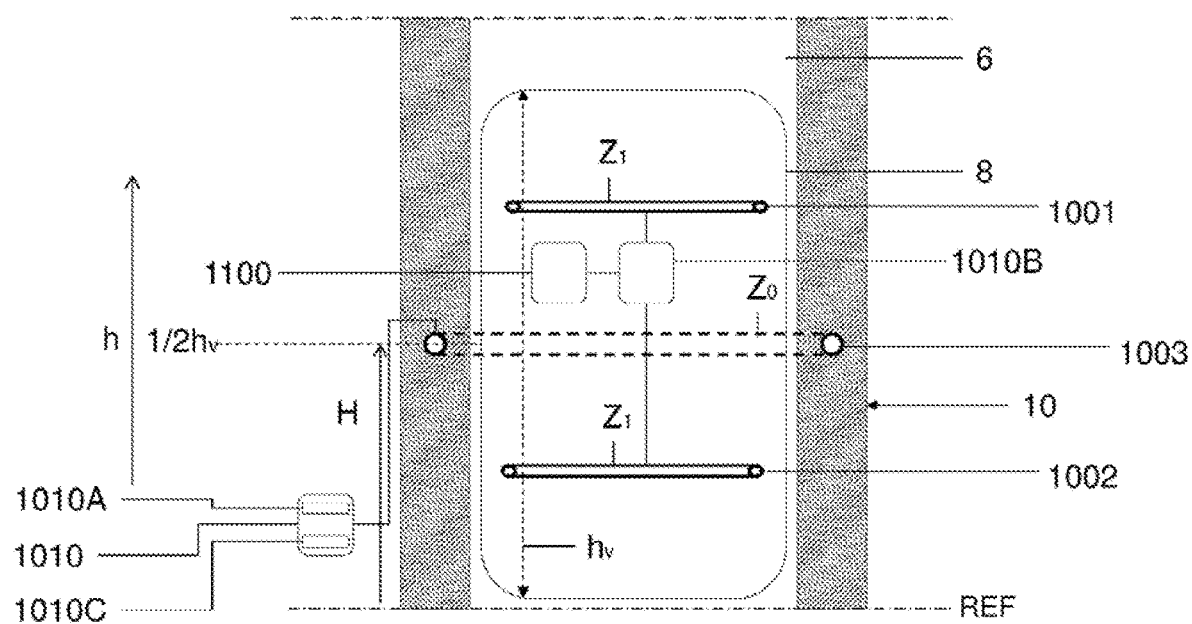
FIG. 13 schematically shows a part of the milk meter according to FIG. 1 or FIG. 3 wherein the sensor device according to a sixth embodiment thereof is shown in more detail.

The invention is not limited to the embodiments outlined hereinbefore. Each coil can consist of one or more turns. Also, a transmitter and third coil 1003 may be mounted to or in the float, and the first coil, second coil and controller may be mounted to or in the stabilization chamber. Each coil which is mounted to or in the stabilization chamber may also be mounted to another part of the milk meter (except for the float) provided that the position of these coils with respect to the stabilization chamber is fixed. In the example of FIG. 6, the controller 1010 comprises transmitter means, receiver means and signal processing means. In a variant according to FIG. 6 as shown in FIG. 13, the transmitter means 1010A and the signal processing means 1010C may be arranged outside the float, whereby the transmitter means 1010A are connected with the third coil 1003 for emitting a transmitting signal which with the aid of the receiver means 1010B is received by the first coil 1001. The transmitting signal is also (simultaneously or not simultaneously with the receiving of the transmitting signal with the first coil 1001) received with the aid of the receiver means 1010B by the second coil 1002. The float is provided with communication means 1100 for wireless supply to the signal processing means 1010C of information about the signals received with the receiver means by the first and second coil. From this information, the coupling between the third coil and the first coil and the coupling between the third coil and the second coil can be determined. And from this, the position of the first coil and the second coil with respect to the third coil can be determined and hence the position of the float with respect to the fixed world, entirely in line with what has been discussed above for the other exemplary embodiments. And with this, also the flow rate of the milk is known.

The invention claimed is:

1. A milk meter for measuring a flow rate of a milk flow, provided with an inlet to which, in use, the milk flow is supplied, an outlet where the milk flow leaves the milk meter, in use, and a liquid flow path extending from the inlet to the outlet, the milk meter is furthermore provided with a stabilization chamber which is included in the liquid flow path and a float which is in the stabilization chamber and is configured to float on milk of the milk flow that is in the stabilization chamber, the milk meter is configured such that a level of milk in the stabilization chamber depends on the flow rate of the milk flow, the milk meter is furthermore provided with at least one sensor device for determining a position of the float in the stabilization chamber in the direction in which the level of the milk can rise and hill in the stabilization chamber for determining the flow rate of the milk flow through the milk meter, the milk meter is further provided with an outflow channel, an outflow opening in fluid communication with the outlet via the outflow channel, wherein the sensor device is provided with at least a first and a second coil which have a fixed distance to each other and at least a third coil, the third coil is displaceable relative to the first and the second coil or vice, versa such that a position of the third coil changes with respect to and positions of first and second coil when the float moves up or down in the stabilization chamber and the milk meter is further provided with transmitter means for supplying a transmitting signal to the third coil so that the first and second coil each generate a receiving signal upon receiving the transmitting signal which has been emitted using the third coil, the milk meter is furthermore provided with signal processing means configured for, on the basis of a ratio between signal strengths of the receiving signals of the first and second coil, determining the position of the float with respect to the stabilization chamber and therewith a magnitude of the flow rate.

2. The milk meter according to chin 1, wherein the signal processing means, are configured for:
   obtaining, from the receiving signals of the first and second coil a first receiving signal of the first coil and a second receiving signal of the second coild; and
   determining the ratio between the first receiving signal of the first coil and the second receiving signal of the second coil for determining the position of the float.

3. The milk meter according to claim 2, wherein the signal processing means, are further configured for determining the logarithm of the ratio for determining the position of the float.

4. The milk meter according to claim 1, wherein axial axes of the first, second, and third coils are each at least substantially directed in the direction in which the float can move up and down in the stabilization chamber.

5. The milk meter according to claim 1, wherein axial axes of the first, second, and third coils at least substantially coincide.

6. The milk meter according to claim 1, wherein the third coil, viewed in the direction in which the float can move up and down in the stabilization chamber, is positioned such that, for a measuring range of interest, it moves between the first and the second coil.

7. The milk meter according to claim 1, wherein the first and second coils are arranged in or on the float and the third coil is fixedly arranged with respect to the stabilization chamber.

8. The milk meter according to claim 7, wherein the third coil extends around the float.

9. The milk meter according to claim 7, wherein the transmitter means and the signal processing means are arranged outside the float, wherein the float is provided with communication means for wireless supply to the signal processing means of information about the transmitting signals received by the first and second coil.

10. The milk meter according to claim 1, wherein the transmitter means and the signal processing means are included in the float, wherein the signal processing means further comprise communication means to emit a determined flow rate wirelessly.

11. The milk meter according to claim 10, wherein the transmitter means, in use, supply the transmitting signal to at least one transmitting coil which is included in the float for supplying the transmitting signal via the transmitting coil to the third coil, which third coil is part of a resonant circuit for emitting the received transmitting signal.

12. The milk meter according to claim 11, rein the at least one transmitting coil is formed by the first and/or second coil.

13. The milk meter according to claim 1, wherein the third coil is mounted inside or on the float, and the first and second coil in the milk meter are fixedly positioned with respect the stabilization chamber.

14. The milk meter according to claim 13, wherein the transmitter means, in use, supply the transmitting signal to at least one transmitting coil which is included outside the float for supplying the transmitting signal via at least one transmitting coil to the third coil, which third coil is part of a resonant circuit for emitting the received transmitting signal.

15. The milk meter according to claim 14, wherein the at least one transmitting coil is formed by the first and/or second coil.

16. The milk meter according to claim 14, wherein the transmitter means and the signal processing means are arranged outside the float.

17. The milk meter according to claim 1, wherein the milk meter is configured such that during a first predetermined period a first transmitting signal is emitted with the first coil, during a third predetermined period a second transmitting signal is emitted with the second coil, the third predetermined period being after the first predetermined period, during a second predetermined period which is between the first and third predetermined period, by the third coil which is part of a resonant circuit, in response to the first transmitting signal, a first passive transmitting signal is emitted which is received by a fourth coil which thereby generates a first receiving signal, during a fourth predetermined period which is after the third predetermined period, by the third coil which is part of the resonant circuit, in response to the second transmitting signal, a second passive transmitting signal is emitted which is received by the fourth coil which thereby generates a second receiving signal, wherein, in use, the signal processing means processes the first and second receiving signal in combination for determining the position of the float with respect to the stabilization chamber and thereby the magnitude of the flow rate, wherein the first, second and fourth coil are attached to the float and the third coil is fixedly disposed with respect to the stabilization chamber, or wherein the first, second and fourth coil are fixedly disposed with respect to the stabilization chamber and the third coil is attached to the float.

18. The milk meter according to claim 1, wherein the milk meter is provided with a buffer reservoir which is included upstream of the stabilization chamber in the liquid flow path, wherein in a sidewall of the buffer reservoir an outflow opening is provided which extends from a lowest point of the outflow opening upwardly and which is in fluid communication with the outlet, wherein a top of the buffer reservoir comprises an inlet opening which is in fluid communication with the inlet, and wherein the buffer reservoir and the stabilization chamber are connected with each other via a fluid connection, such that the buffer reservoir, the fluid connection and the stabilization chamber, in use, function as communicating, vessels so that, in use, a level of the milk in the stabilization chamber is equal to a level of the milk in the buffer reservoir.

\* \* \* \* \*